US005631713A

United States Patent [19]
Hoshino

[11] Patent Number: 5,631,713
[45] Date of Patent: May 20, 1997

[54] VIDEO PROCESSOR WITH FIELD MEMORY FOR EXCLUSIVELY STORING PICTURE INFORMATION

[75] Inventor: Yasuharu Hoshino, Tokyo, Japan

[73] Assignee: NEC Corporation, Tokyo, Japan

[21] Appl. No.: 392,179

[22] Filed: Feb. 22, 1995

[30] Foreign Application Priority Data

Feb. 24, 1994 [JP] Japan .................. 6-049995

[51] Int. Cl.$^6$ .................................................. H04N 5/14
[52] U.S. Cl. ................ 348/716; 348/513; 348/715
[58] Field of Search ........................ 348/513, 571, 348/714–716, 718, 719; H04N 5/14

[56] References Cited

U.S. PATENT DOCUMENTS

| | | | |
|---|---|---|---|
| 4,018,990 | 4/1977 | Long et al. ................ | 358/149 |
| 4,134,131 | 1/1979 | Hopkins, Jr. ................ | 348/513 |
| 4,148,070 | 4/1979 | Taylor ................ | 348/719 |
| 4,646,151 | 2/1987 | Welles, II et al. ................ | 358/149 |
| 4,835,612 | 5/1989 | Ohishi ................ | 348/716 |
| 4,843,471 | 6/1989 | Yazawa et al. . | |
| 5,347,322 | 9/1994 | Levine et al. ................ | 348/718 |

FOREIGN PATENT DOCUMENTS 60-261265  12/1985  Japan .

OTHER PUBLICATIONS

M.J.M. Pelgrom et al.; "A Digital Field Memory for Television Receivers"; IEEE Transactions on Consumer Electronics, vol. CE–29, No. 3, Aug. 1983, pp. 242–250.

European Search Report.

*Primary Examiner*—Victor R. Kostak
*Attorney, Agent, or Firm*—Whitham, Curtis, Whitham & McGinn

[57] ABSTRACT

In a Video processor, an analog composite video signal is converted by an A/D converter (10) to a digital bit sequence in response to a system clock pulse. By using the system clock pulse and horizontal and vertical synchronizing pulses separated from the composite signal, a horizontal blanking interval and a vertical blanking interval are detected by control circuitry (21~24) and the read/write operations of a field memory (12) are disabled during the horizontal and vertical blanking intervals and enabled at other times. The picture information from the memory is converted by a D/A converter (13) to analog form in response to the system clock pulse. A multiplex of a digital pedestal level signal and a digital synchronization level signal is supplied to the D/A converter (13) when the memory is disabled.

19 Claims, 5 Drawing Sheets

FIG. 2
CONTROLLER 24

VIDEO PROCESSOR WITH FIELD MEMORY FOR EXCLUSIVELY STORING PICTURE INFORMATION

BACKGROUND OF THE INVENTION

1. Field of the Invention

The present invention relates generally to video processors, and more specifically to a technique for efficient utilization of a field memory for storing video signals.

2. Description of the Related Art

In conventional video processors, an analog composite color video signal is converted to a digital signal and all information contained in each field of the video signal are stored into a field memory and successively read out of the memory for digital-to-analog conversion. The use of the field memory is to provide features such as noise reduction and production of frozen and mosaic pictures. An address counter is provided in the field memory to provide read/write control. To determine the actual size of the field memory, the address counter is reset in response to a vertical sync pulse separated from the composite video signal. In addition to the picture information, the field information stored in the current field memory contains vertical and horizontal synchronizing signals whose waveforms are strictly specified according to the NTSC or PAL standard. Therefore, part of the field memory is always occupied by the signals which do not contribute to picture quality.

SUMMARY OF THE INVENTION

It is therefore an object of the present invention to provide a video processor which provides efficient utilization of a memory by exclusively storing picture information of a composite video signal.

According to a broader aspect of the present invention, a blanking interval of an incoming composite video signal is detected and read/write operations of a memory are disabled during the blanking interval and enabled at other times so that field picture information of the incoming video signal is exclusively stored into, and read out of, the memory into an external circuit.

In a preferred embodiment, a pedestal level signal and a synchronization level signal are multiplexed and supplied to the external circuit when the memory is disabled.

According to a specific aspect of the present invention, an analog composite video signal is converted by an analog-to-digital converter to a digital bit sequence in response to a system clock pulse. By using the system clock pulse and horizontal and vertical synchronizing pulses separated from the composite signal, a horizontal blanking interval and a vertical blanking interval are detected and the read/write operations of a memory are disabled during the horizontal and vertical blanking intervals and enabled at other times. The picture information from the memory is converted by a digital-to-analog converter to analog form in response to the system clock pulse. A multiplex of a digital pedestal level signal and a digital synchronization level signal is supplied to the digital-to-analog converter when the memory is disabled.

According to a further aspect of the present invention, there is provided a video processor wherein a first clock pulse is generated at a system clock rate and a second clock pulse at a rate equal to an integral submultiple of the system clock rate. A first analog-to-digital converter provides A/D conversion of an analog luminance (Y) signal in response to the first clock pulse. Second and third analog-to-digital converters provide A/D conversion of an analog R-Y color difference signal and an analog B-Y color difference signal, respectively, to a digital R-Y color difference signal and a digital B-Y color difference signal in response to the second clock pulse. The digital R-Y and B-Y color difference signals are converted to a pair of bit-serial signals having the same rate as the output of the first analog-to-digital converter. Responsive to the first clock pulse and horizontal and vertical synchronizing pulses a control circuitry detects a horizontal blanking interval and a vertical blanking interval and disables the read/write operations of a memory during the horizontal and vertical blanking intervals and enables the read/write operations at other times so that field picture information of the video signal and the pair of bit-serial signals are exclusively stored into, and read out of, the memory. A first digital-to-analog converter is responsive to the first clock pulse for converting the picture information from the memory in response to the first clock pulse. The pair of stored bit-serial signals are converted to a pair of bit-parallel signals, which are respectively fed to second and third digital-to-analog converters and converted to analog form in response to the second clock pulse.

BRIEF DESCRIPTION OF THE DRAWINGS

The present invention will be described in further detail with reference to the accompanying drawings, in which.

DETAILED DESCRIPTION

Figure 1:
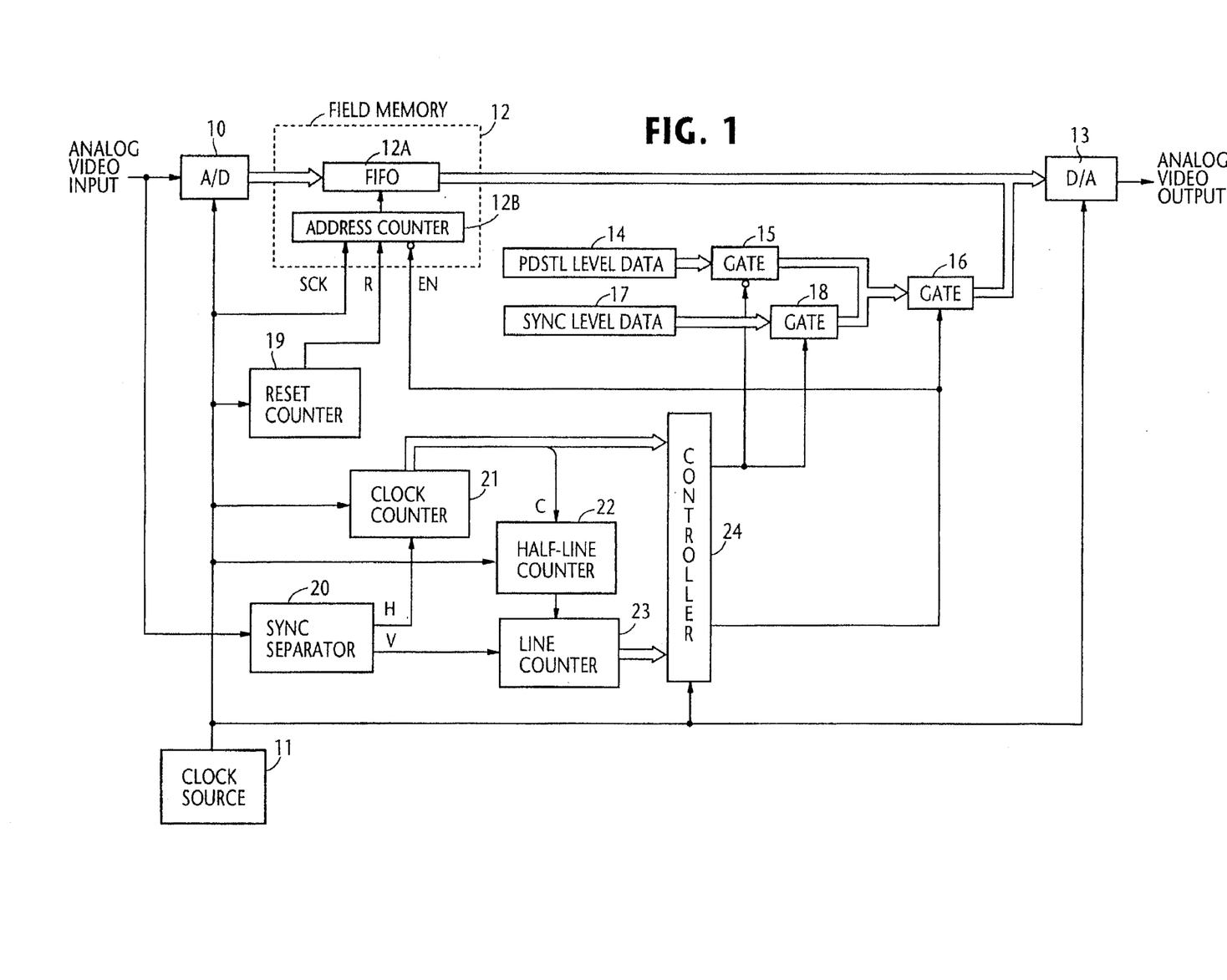
FIG. 1 is a block diagram of a video processor according to a first embodiment of the present invention.

Referring now to FIG. 1, there is shown a video processor for a field memory according to a first embodiment. The video processor includes an analog-to-digital converter 10 for converting a composite analog NTSC (National Television System Committee) color signal to an 8-bit digital signal in response to a sampling pulse which is supplied from a system clock source 11 at a frequency four times higher than the color subcarrier frequency of the video signal. The input color signal includes the color-picture signal plus blanking and all synchronizing signals. In a typical example, the field memory 12 comprises a first-in-first-out memory 12A and an address counter 12B which is clocked by the system clock rate and enabled in a manner as will be described to provide read and write operations of memory 12A exclusively on the digital color-picture information of the output of A/D converter 10. The blanking and all synchronizing signals are not stored in the FIFO memory 12A.

Specifically, during each system clock interval when the field memory is enabled, the memory alternately operates in a read and a write mode so that the stored 8-bit color-picture information of a given field is read out of the memory into a digital-to-analog converter 13 and overwritten with an 8-bit picture signal of the next field. When the field memory is disabled, a gate 16 is enabled and gates 15 and 18 are alternately enabled to provide the D/A converter 13 with 8-bit pedestal level data and 8-bit sync level data from registers 14 and 17, respectively. The D/A converter 13 is also clocked by the system clock rate to recover the original analog picture-signal plus blanking and all synchronizing signals. A controller 24 is provided for producing a memory data select (MDS) signal and a register data select (RDS) signal in mutually exclusive times. The memory data selector signal is applied to the enable input of field memory 12 and gate 16 and the register data select signal is applied to gates 15 and 18.

The effective size of the field memory 12 is determined by a reset counter 19, which counts the system clock and produces an output pulse R when the number of system clock pulses reaches a predetermined value. The field interval between successive fields of the incoming video signal corresponds to the interval between the arrival time at the input of A/D converter 10 and the delivery time from the D/A converter 13. Since the color subcarrier frequency of the NTSC standard is 455/2 times the line frequency $f_h$ for each field interval, the number of system clock pulses that occur during a line interval ($1/f_h$) is equal to 910 (=4×455/2). Since the field interval of NTSC signal has 262 horizontal lines, it contains 238,875 (=910×525/2) system clock pulses. Therefore, the reset pulse R is produced by counter 19 at every 238,875 system clock pulses and applied to the address counter 12B of field memory 12 so that it is initialized at every 238,875 clock pulses. The amount of time in which the video signal remains in the field memory 12 is equal to the field interval minus the conversion periods taken by A/D converter 10 and D/A converter 13.

The composite analog video input signal is also supplied to a sync separator 20 for separating the synchronizing signals from the color-picture signal and producing pulses H and V in response to the separated horizontal and vertical synchronizing signals, respectively. A clock counter 21 counts the system clock to produce a multi-bit signal indicating the instantaneous timing position of the system clock pulse with respect to the start timing of each scan line which is defined by the pulse H of sync separator 20. The multi-bit output of clock counter 21 feeds the controller 24, and includes a carry pulse which is used to reset a half-line counter 22. Half-line counter 22 starts counting the system clock in response to the reset pulse from clock counter 21 to produce two output pulses during the period of each horizontal line. A line counter 23 is provided for counting the output of half-line counter 22. This counter is reset by the pulse V of separator 20 to supply the controller 24 with a multi-bit signal identifying each horizontal line of a vertical scan interval.

Figure 2:
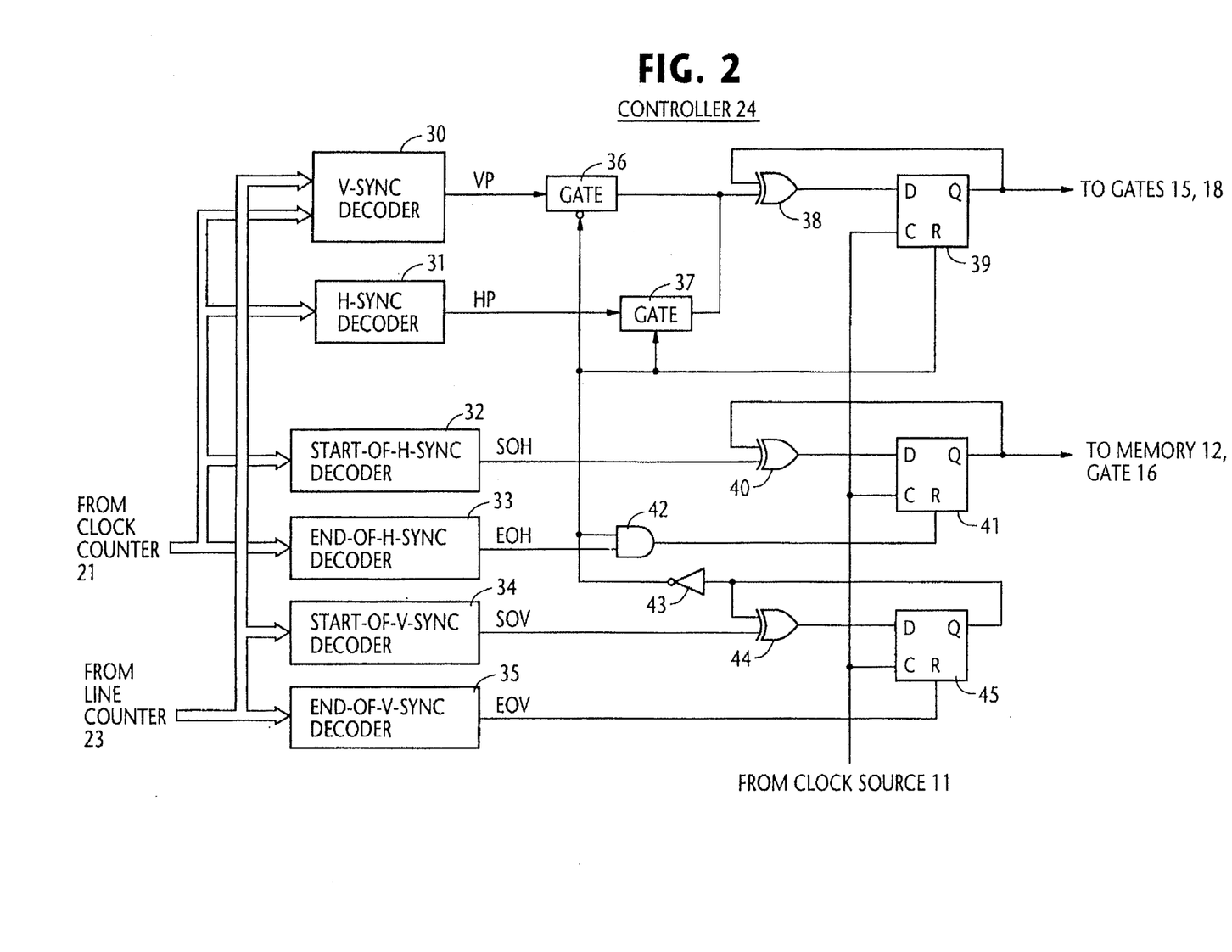
FIG. 2 is a circuit diagram of the controller of FIG. 1.

As shown in FIG. 2, the controller 24 includes vertical and horizontal sync decoders 30 and 31. Vertical sync decoder 30 is responsive to the outputs of clock counter 21 and line counter 23 for producing a prescribed vertical pattern VP. In a typical example, the vertical pulse pattern VP continues for a duration of twenty lines. Horizontal sync decoder 31 is responsive to the output of clock counter 21 for producing a prescribed horizontal pulse pattern HP. More specifically, the vertical pulse pattern VP consists of a series of pulses which occurs in pair at half line intervals and two single pulses that occur at appropriate positions of the pulse pattern to define a vertical blanking interval. The horizontal pulse pattern HP consists of a series of pulses in pairs with each pair occurring at line intervals. A start-of-H-sync decoder 32 and an end-of-H-sync decoder 32 are connected to the output of clock counter 21 to produce a SOH (start-of-horizontal synchronization) pulse and an EOH (end-of-horizontal synchronization) pulse, respectively. A start-of-V-sync decoder 34 and an end-of-V-sync decoder 35 are connected to the output of line counter 23 to produce a SOV (start-of-vertical synchronization) pulse and an EOV (end-of-vertical synchronization) pulse, respectively.

The outputs of vertical sync and horizontal sync decoders 30 and 31 are connected respectively to window gates 36 and 37 to which the output of a NOT circuit 43 is applied to enable one of the gates. When the logic level at the output of NOT circuit 43 is high, gate 37 is enabled to pass the horizontal pulse pattern HP to one input of an exclusive-OR gate 38. When the logic level is low, gate 36 is enabled to pass the vertical pulse pattern VP to the exclusive-OR gate 38. The output of exclusive-OR gate 38 is connected to the data input of a D-flip-flop 39 whose Q output is connected to the other input of exclusive-OR gate 38. Flip-flop 39 receives the output of NOT circuit 43 at the clear (reset) terminal. The output of flip-flop 39 is connected to the gates 15 and 18 for selectively coupling the pedestal level data and sync level data to gate 16. The purpose of SOH and EOH decoders 32, 33 is to precisely determine the instants for the pulse pairs of the horizontal pulse pattern HP, and likewise the purpose of SOV and EOV decoders 34, 35 is to extract the necessary pulses from the vertical pulse pattern VP whose timing is not sufficiently precise.

The output of start-of-horizontal-sync decoder 32 is connected to one input of an exclusive-OR gate 40 which drives a D-flip-flop 41 through its data input, the Q output of flip-flop 41 being coupled to the other input of exclusive-OR gate 40. The output signal of flip-flop 41 is the control signal applied to the memory 12 and gate 16. The output of end-of-horizontal-sync decoder 33 is connected on one input of an AND gate 42 whose output is coupled to the reset terminal of flip-flop 41. The other input of AND gate 42 is connected to the output of NOT circuit 43. The output of start-of-vertical-sync decoder 34 is connected to one input of an exclusive-OR gate 44 which drives a D-flip-flop 45 through its data input, the Q output of flip-flop 45 being coupled to the other input of exclusive-OR gate 44 and to the input of NOT circuit 43. The output of end-of-vertical-sync decoder 35 is used to clear the flip-flop 45. All the flip-flops operate at the system clock rate.

Figure 3:
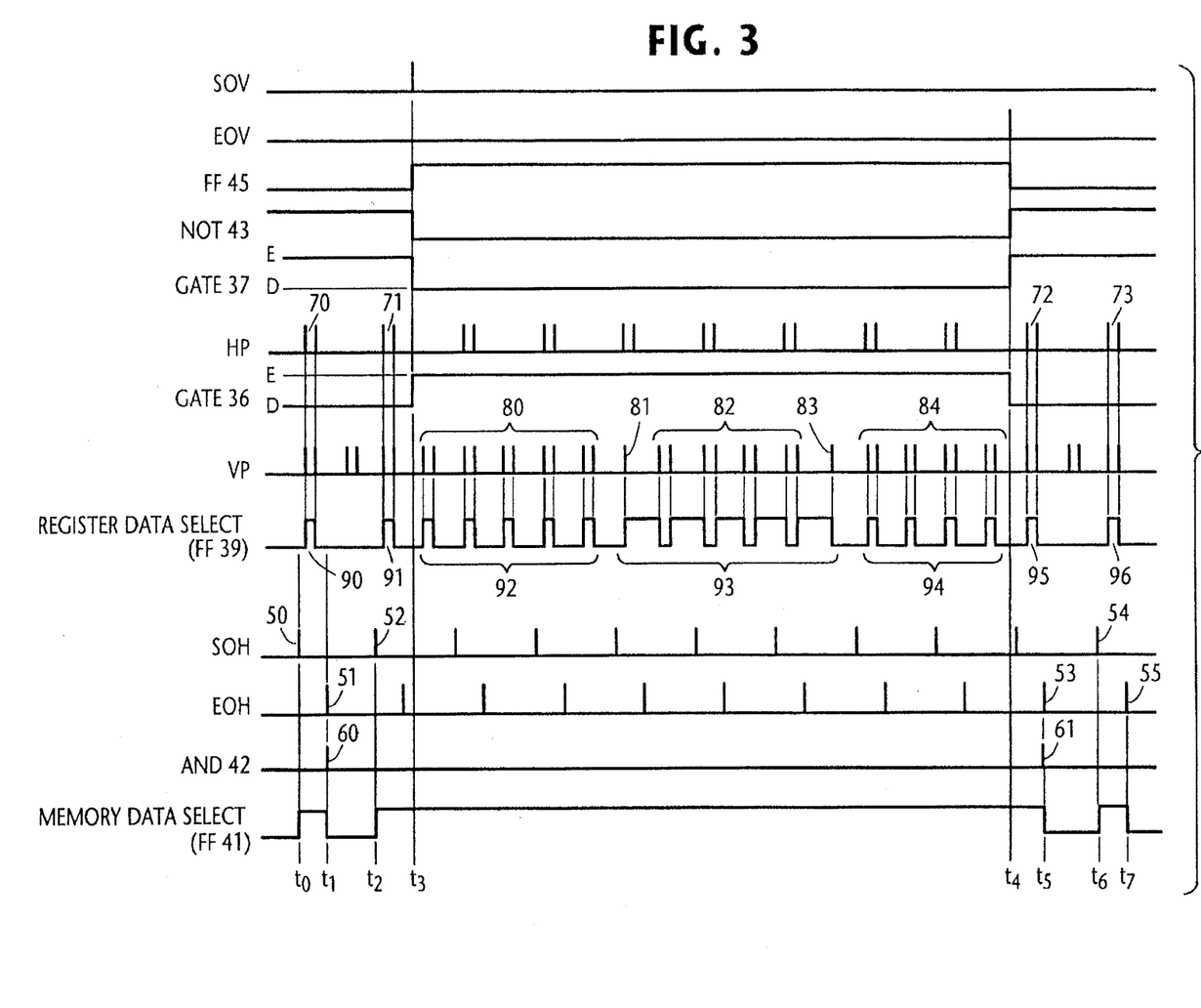
FIG. 3 is a timing diagram associated with the circuit diagram of FIG. 2.

The operation of the controller 24 will be described with reference to FIG. 3. Initially, the Q output of flip-flop 45 is at low logic level, the output of NOT circuit 43 is high, enabling the gate 37 and disabling the gate 37 as well as the AND gate 42.

At time $t_0$, the start-of-horizontal-sync detector 32 produces a SOH pulse 50. Since the logic level at the Q output of flip-flop 41 is low, the exclusive-OR gate 40 goes high, causing the flip-flop 41 to switch its Q output to high logic level at the timing of the system clock. At time $t_1$, an EOH pulse 51 is produced by the decoder 33, causing the AND gate 42 to produce a pulse 60, allowing the flip-flop 41 to reset to low output logic state at the timing of the system clock. The interval between times $t_0$ and $t_1$ defines a horizontal blanking interval.

At time $t_2$, the detector 32 produces a SOH pulse 52 which causes flip-flop 41 to switch its output to high logic level.

During the time prior to time $t_3$, pulse pairs 70 and 71 of the horizontal pulse pattern HP are passed through the gate 37 to the exclusive-OR gate 38. Since the logic level at the output of flip-flop 39 is low, the exclusive-OR gate 38 goes high in response to the first pulse of initial horizontal pulse pair 70, causing the flip-flop 39 to go high at the timing of the system clock. With the output of flip-flop 39 being high, the application of the second pulse of the first horizontal pulse pair 70 causes the output of exclusive-OR gate 38 to go low. The output of flip-flop 39 thus goes low at the timing of the system clock, thus producing a first output pulse 90. In a similar manner, the pulses of the second pulse pair 71 causes flip-flop 39 to produce a second output pulse 91.

At time $t_3$, a SOV pulse is generated by decoder 34, causing flip-flop 45 to change its Q output state to high logic level. The output of NOT circuit 43 thus goes low, disabling the gate 37 and enabling the gate 36 to pass the vertical pulse pattern VP to the exclusive-OR gate 38, including five pulse pairs 80, a single pulse 81, four pulse pairs 82, a single pulse 83 and four pulse pairs 84. As a result, the flip-flop 39 produces a series of five short-duration pulses 92 in response to the VP pulses 80, a series of long-duration pulses 93 in response to the VP pulses 81 to 83, and a series of four short-duration pulses 94 in response to the VP pulses 84.

At time $t_4$, an EOV pulse is produced by decoder 35 to reset the flip-flop 45. The output of NOT circuit 43 thus goes high, so that the gate 37 and AND gate 42 are enabled, and the gate 36 is disabled. Pulse pairs 72 and 73 of the horizontal pulse pattern HP are passed through gate 37 to the exclusive-OR gate 38, so that flip-flop 39 produces pulses 95 and 96.

At time $t_5$, an EOH pulse 53 is produced by decoder 33. Since AND gate 42 is enabled, it produces a pulse 61 which causes flip-flop 41 to change states from high to low output state. The interval between times $t_2$ and $t_5$ defines the vertical blanking interval.

In response to a SOH pulse 54 at time $t_6$, flip-flop 41 changes states from low to high output state and at time $t_7$, it changes from high to low state in response to an EOH pulse 55. The interval between times $t_6$ and $t_7$ defines a horizontal blanking interval.

Figure 4:
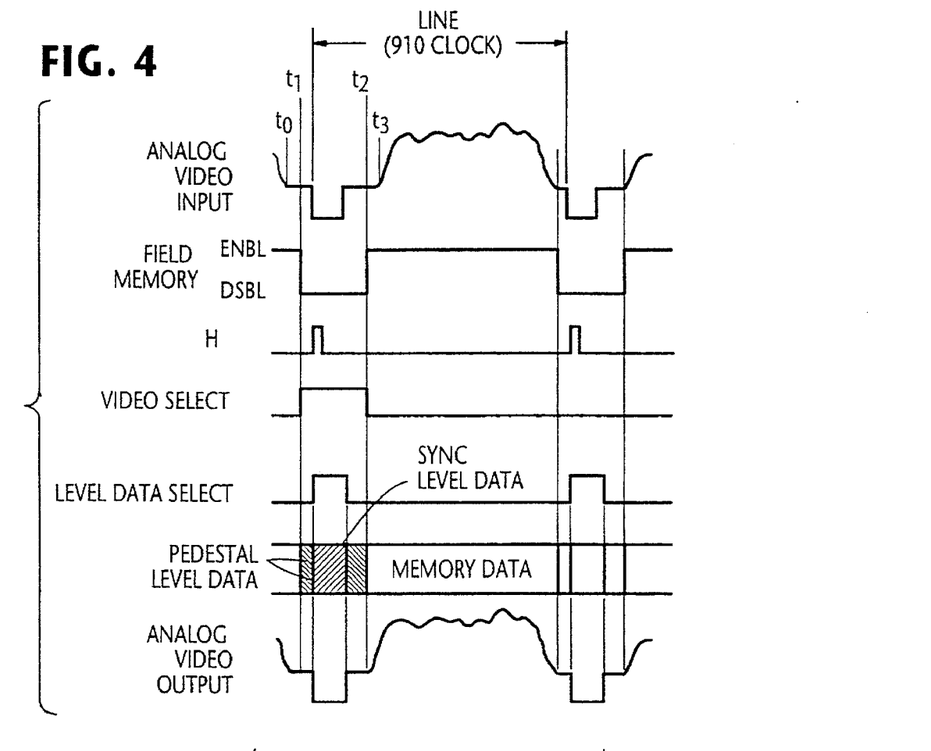
FIG. 4 is a timing diagram useful for describing the operation of the present invention during a line interval.

It is seen that during the horizontal and vertical blanking intervals, the field memory 12 is disabled. During the horizontal blanking intervals, gate 16 is enabled to pass the pedestal level data from register 14 to the D/A converter 13 when the level data select signal at the output of flip-flop 39 is high or pass the sync level data from register 15 to the D/A converter when the levee data select signal is low, as shown in FIG. 4, in which the waveform of the composite color television signal for a line period is depicted. The pedestal and sync level data are multiplexed with digital picture information read out of field memory 12 and converted by the D/Aa converter 13 into analog form for delivery to an external circuit, not shown. As illustrated in FIG. 4, the field memory 12 is disabled at time $t_1$ following a safety time margin from the start timing $t_0$ of each horizontal blanking interval and enabled again at time $t_2$ which is earlier than the start timing $t_3$ of picture information to allow for safety time margin.

Figure 5:
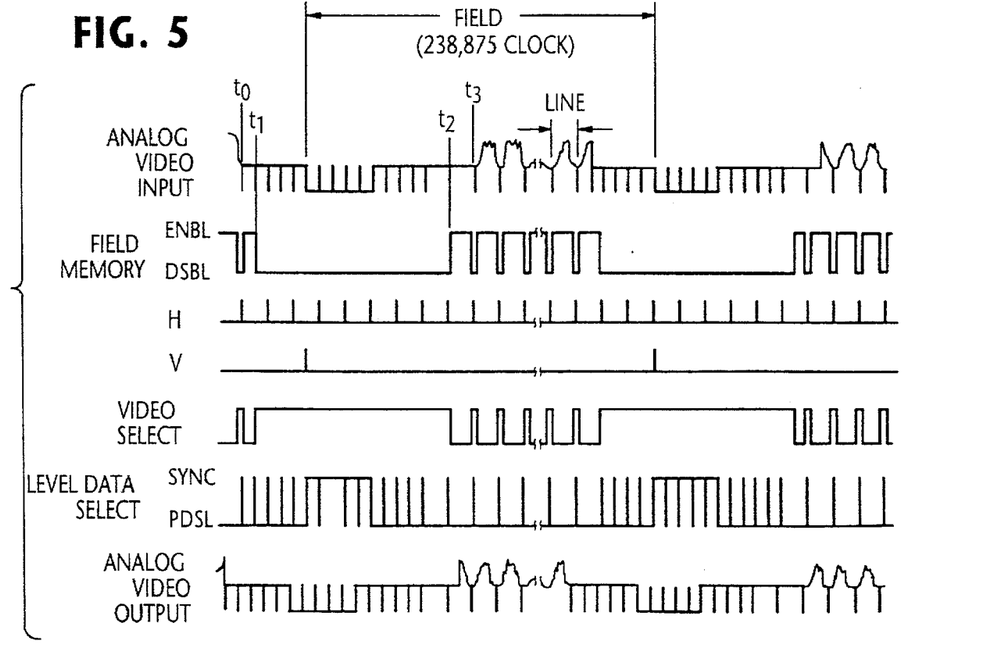
FIG. 5 is a timing diagram useful for describing the operation of the present invention during a field interval.

As illustrated in FIG. 5, the field memory 12 is disabled at time $t_1$ following a safety time margin from the start timing $t_0$ of each vertical blanking interval and enabled again at time $t_2$ which is earlier than the start timing $t_3$ of picture information to allow for safety time margin.

By disabling the field memory as described, an equivalent of 120 system clock pulses can be saved for each horizontal line period and a savings of at least 20 lines is obtained for each vertical blanking interval. Therefore, the capacity required for the field memory is 1,529,440 bits, which represents a reduction of about 20 percent in comparison with the current memory capacity of 1,907,360 (=910×262× 8) bits.

While mention has been made of memory size savings, the present invention could be used to achieve efficient utilization of memory space for storing more video information than is possible with the same memory space using the current read/write technology.

Figure 6:
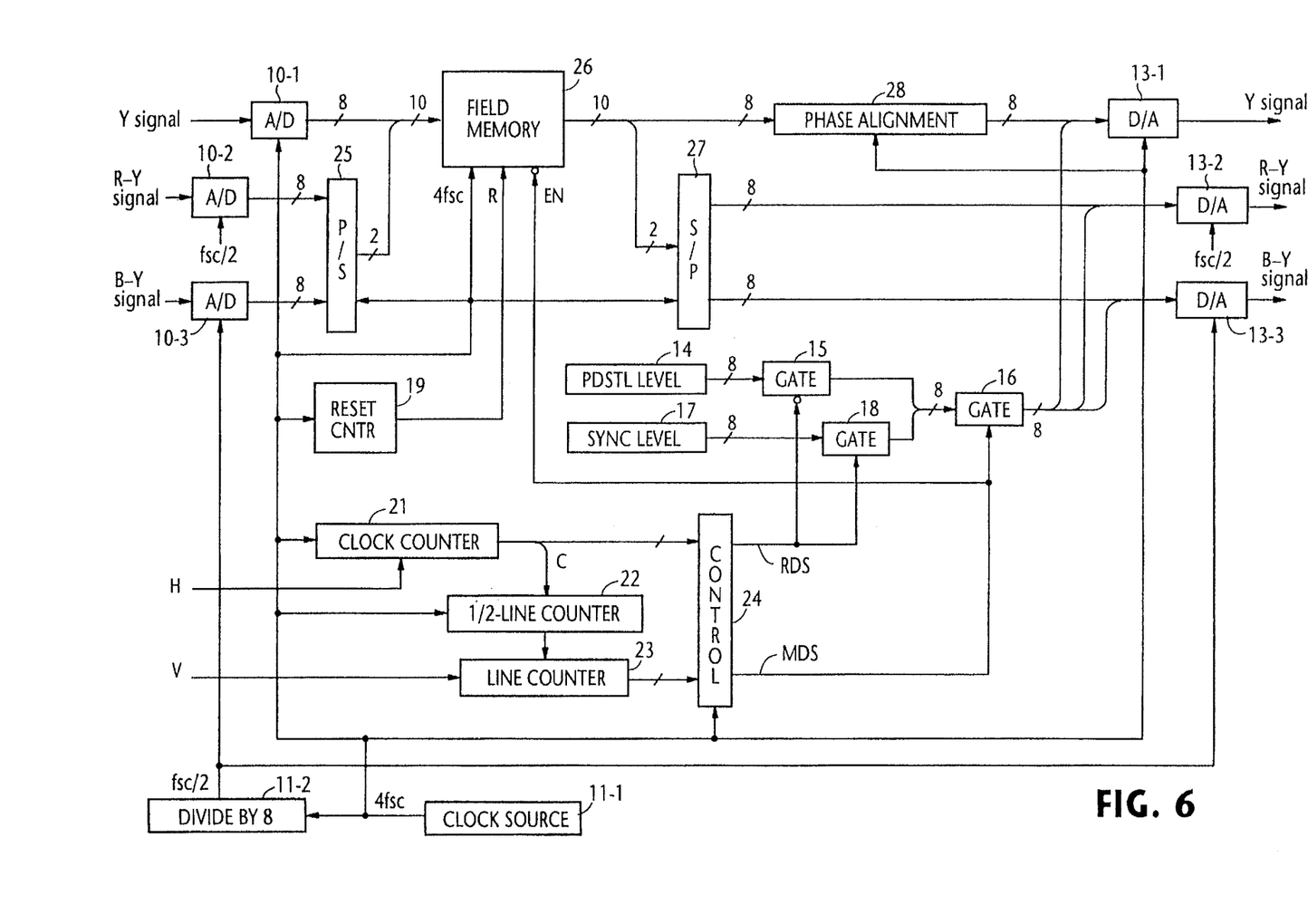
FIG. 6 is a block diagram of a video processor according to a second embodiment of the present invention.

FIG. 6 shows a second embodiment of the present invention in which the composite color video signal is divided into luminance (Y-signal), R-Y and B-Y color difference signals, which are supplied respectively to A/D converters 10-1, 10-2 and 10-3. System clock source 11-1 supplies the system clock at four times the subcarrier frequency fsc (4 fsc). This clock rate is divided by a factor 8 by a frequency divider 11-2 to produce a clock rate fsc/2. A/D converter 10-1 is driven at the system clock rate 4 fsc. Since the bandwidth of the color difference signals is narrower than that of the luminance signal, A/D converters 10-2 and 10-3 are driven at the fsc/2 rate, i.e., ⅛ of the rate at which the Y-signal is sampled. Each of these A/D converters produces an 8-bit digital signal. The outputs of A/D converters 10-2 and 10-3 are supplied to a parallel-to-serial converter 25 where they are converted at the 4 fsc rate to 2-bit serial data and combined with the 8-bit Y-signal from A/D converter 10-1 and supplied as 10-bit wide parallel data to a field memory 26. As in the first embodiment, the field memory 26 is supplied with the 4 fsc system clock and reset pulse and enabled in response to the memory data select signal from controller 24.

The 8-bit luminance signal from field memory 26 is supplied to a phase alignment circuit 28 which is driven at the system clock rate to introduce a delay so that the luminance signal is aligned in phase with the color difference signals. The output of phase alignment circuit 28 is applied to D/A converter 13-1 which is driven at the 4 fsc system clock. The 2-bit wide color difference signals are fed to a serial-to-parallel converter 27 which is driven at the system clock to convert them into an 8-bit R-Y signal and an 8-bit B-Y signal. The outputs of serial-to-parallel converter 27 are respectively supplied to D/A converters 13-2 and 13-3, each of which is driven at the fsc/2 clock rate, to recover the original color difference signals. The 8-bit output of gate 16 is coupled to the input of each of D/A converters 13-1, 13-2 and 13-3.

What is claimed is:

1. A video processor, comprising:
   a field memory; and
   means for detecting a blanking interval of an incoming composite video signal and disabling read/write operations of said field memory during said blanking interval and for enabling the read/write operations of the memory at other times so that field picture information of said incoming video signal is exclusively stored into, and read out of, the field memory into an external circuit.

2. A video processor as claimed in claim 1, wherein said field memory has a memory size smaller than would be required to store all information contained in each field of the incoming composite video signal.

3. A video processor comprising:
   a field memory;
   means for detecting a blanking interval of an incoming composite video signal and disabling read/write operations of said field memory during said blanking interval and enabling the read/write operations of the memory at other times so that field picture information of said incoming video signal is exclusively stored into, and read out of, the field memory into an external circuit; and
   means for alternately multiplexing a pedestal level signal with a synchronization level signal and supplying the multiplexed signal to said external circuit when the memory is disabled.

4. A video processor comprising:

a system clock source for producing a system clock pulse;

an analog-to-digital converter for converting an analog composite video signal to a digital bit sequence in response to the system clock pulse;

a memory connected to said analog-to-digital converter;

sync separator means for producing a horizontal synchronizing pulse and a vertical synchronizing pulse from said analog composite video signal;

control means, responsive to said system clock pulse and said horizontal and vertical synchronizing pulses, for detecting a horizontal blanking interval and a vertical blanking interval and for disabling read/write operations of said memory during said horizontal and vertical blanking intervals and for enabling the read/write operations of the memory at other times so that a digital bit sequence of said analog-to-digital converter representing picture information of a field of said video signal is exclusively stored into, and read out of, the memory; and a digital-to-analog converter for converting the digital bit sequence representing the picture information from the memory to analog form in response to said system clock pulse.

5. A video processor as claimed in claim 4, wherein said memory has a memory size smaller than would be required to store information contained in each field of the incoming composite video signal.

6. A video processor as claimed in claim 4, further comprising:

an address counter for generating a read/write address for said memory in response to said system clock pulse; and a reset counter for counting said system clock pulse and resetting said address counter to an initial value when the system clock pulse is counted a predetermined number of times.

7. A video processor comprising:

a system clock source for producing a system clock pulse;

an analog-to-digital converter for converting an analog composite video signal to a digital bit sequence in response to the system clock pulse;

a memory connected to said analog-to-digital converter;

sync separator means for producing a horizontal synchronizing pulse and a vertical synchronizing pulse from said analog composite video signal;

control means responsive to said system clock pulse and said horizontal and vertical synchronizing pulses for detecting a horizontal blanking interval and a vertical blanking interval and disabling read/write operations of said memory during said horizontal and vertical blanking intervals and enabling the read/write operations of the memory at other times so that a digital bit sequence of said analog-to-digital converter representing picture information of a field of said video signal is exclusively stored into and read out of the memory;

a digital-to=analog converter for converting the digital bit sequence representing the picture information from the memory to analog form in response to said system clock pulse; and means for alternatively multiplexing a digital pedestal level signal and a digital synchronization level signal and supplying the multiplexed signals to said digital-to-analog converter when the memory is disabled.

8. A video processor as claimed in claim 7, wherein said control means comprises:

a clock counter arranged to be reset by said horizontal synchronizing pulse for counting said system clock pulse and producing therefrom an output signal indicating the timing position of the system clock pulse with respect to a reference position of each horizontal line of said picture signal and producing a carry signal when the clock counter is incremented to a predetermined value;

a line counter arranged to be reset by said vertical synchronizing pulse for counting said carry signal and producing therefrom an output signal indicating the position of each horizontal line with respect to a reference position of a field of said picture signal;

a vertical sync decoder responsive to the output signals of said clock and line counters for producing a predetermined pattern of pulses for a plurality of line intervals;

a horizontal sync decoder responsive to the output signal of said clock counter for producing a predetermined pattern of pulses;

a start-of-horizontal-sync detector responsive to the output signal of said clock counter for detecting a start of horizontal synchronization and producing therefrom an output pulse;

an end-of-horizontal-sync detector responsive to the output signal of said clock counter for detecting an end of horizontal synchronization and producing therefrom output pulse;

a start-of-vertical-sync detector responsive to the output signal of said line counter for detecting a start of vertical synchronization and producing therefrom an output pulse;

an end-of-vertical-sync detector responsive to the output signal of said line counter for detecting an end of vertical synchronization and producing therefrom an output pulse; and a logic circuit responsive to the output pulses of the start-of-horizontal-sync detector, the end-of-horizontal-sync detector, the start-of-vertical-sync detector and the end-of-vertical sync detector for producing a first sequence of pulses defining said horizontal blanking interval and said vertical blanking interval, and a second sequence of pulses having edges corresponding to the pulses of the pattern produced by the horizontal sync decoder during the defined horizontal blanking interval and corresponding to the pulses of the pattern produced by the vertical sync decoder during the defined vertical blanking interval, said first sequence of pulses enabling and disabling said memory depending on the logic levels thereof, and said first and second sequences of pulses being supplied to said multiplexer means for alternately multiplexing the pedestal level data and the sync level data when the memory is disabled.

9. A video processor comprising:

a clock source for producing a first clock pulse at a system clock rate and a second clock pulse at a rate equal to an integral submultiple of the system clock rate;

a first analog-to-digital converter for converting an analog luminance (Y) signal of a composite video signal to a digital Y signal in response to the first clock pulse;

second and third analog-to-digital converters for converting an analog R-Y color difference signal and an analog B-Y color difference signal, respectively, of said composite video signal to a digital R-Y color difference signal and a digital B-Y color difference signal in response to the second clock pulse;

a parallel-to-serial converter for converting the digital R-Y color difference signal and the digital B-Y color difference signal to a pair of bit-serial signals having the same rate as the output of said first analog-to-digital converter;

a memory connected to said first analog-to-digital converter and said parallel-to-serial converter;

sync separator means for producing a horizontal synchronizing pulse and a vertical synchronizing pulse from said composite video signal;

control means connected to be responsive to said first clock pulse from said clock source and to said horizontal and vertical synchronizing pulses from said sync separator means for detecting a horizontal blanking interval and a vertical blanking interval of said composite video signal and disabling read/write operations of said memory during said horizontal and vertical blanking intervals and enabling the read/write operations of the memory at other times so that field picture information of said digital Y signal from the first analog-to-digital converter and of the pair of bit-serial signals from the parallel-to-serial converter are exclusively stored into, and read out of, the memory;

a first digital-to-analog converter for converting the picture information from the memory in response to said first clock pulse;

a serial-to-parallel converter for converting the pair of stored bit-serial signals to a pair of bit-parallel signals; and second and third digital-to-analog converters for respectively converting the bit-parallel signals from the serial-to-parallel converter to analog form in response to said second clock pulse.

10. A video processor as claimed in claim 9, further comprising:

an address counter for generating a read/write address for said memory in response to said system clock pulse; and a reset counter for counting said system clock pulse and resetting said address counter to an initial value when the system clock pulse is counted a predetermined number of times.

11. A video processor as claimed in claim 9, further comprising means for providing phase alignment between the picture information read out of said memory and the bit-parallel signals from said serial-to-parallel converter.

12. A video processor comprising:

a clock source for producing a first clock pulse at a system clock rate and a second clock pulse at a rate equal to an integral submultiple of the system clock rate;

a first analog-to-digital converter for converting an analog luminance (Y) signal of a composite video signal to a digital Y signal in response to the first clock pulse;

second and third analog-to-digital converters for converting an analog R-Y color difference signal and an analog B-Y color difference signal, respectively, of said composite video signal to a digital R-Y color difference signal and a digital B-Y color difference signal in response to the second clock pulse;

a parallel-to-serial converter for converting the digital R-Y color difference signal and the digital B-Y color difference signal to a pair of bit-serial signals having the same rate as the output of said first analog-to-digital converter;

a memory connected to said first analog-to-digital converter and said parallel-to-serial converter;

sync separator means for producing a horizontal synchronizing pulse and a vertical synchronizing pulse from said composite video signal;

control means connected to be responsive to said first clock pulse from said clock source and to said horizontal and vertical synchronizing pulses from said sync separator means for detecting a horizontal blanking interval and a vertical blanking interval of said composite video signal and disabling read/write operations of said memory during said horizontal and vertical blanking intervals and enabling the read/write operations of the memory at other times so that field picture information of said digital Y signal from the first analog-to-digital converter and of the pair of bit-serial signals from the parallel-to-serial converter are exclusively stored into, and read out of, the memory;

a first digital-to-analog converter for converting the picture information from the memory in response to said first clock pulse;

a serial-to-parallel converter for converting the pair of stored bit-serial signals to a pair of bit-parallel signals;

second and third digital-to-analog converters for respectively converting the bit-parallel signals from the serial-to-parallel converter to analog form in response to said second clock pulse; and means for alternately multiplexing a digital pedestal level signal and a digital synchronization level signal and supplying the multiplexed signals to second and third digital-to-analog converters when the memory is disabled.

13. A video processor as claimed in claim 12, wherein said control means comprises:

a clock counter arranged to be reset by said horizontal synchronizing pulse for counting said system clock pulse and producing therefrom an output signal indicating the timing position of the system clock pulse with respect to a reference position of each horizontal line of said picture signal and producing a carry signal when the clock counter is incremented to a predetermined value;

a line counter arranged to be reset by said vertical synchronizing pulse for counting said carry signal and producing therefrom an output signal indicating the position of each horizontal line with respect to a reference position of a field of said picture signal;

a vertical sync decoder responsive to the output signals of said clock and line counters for producing a predetermined pattern of pulses for a plurality of line intervals;

a horizontal sync decoder responsive to the output signal of said clock counter for producing a predetermined pattern of pulses;

a start-of-horizontal-sync detector responsive to the output signal of said clock counter for detecting a start of horizontal synchronization and producing therefrom an output pulse;

an end-of-horizontal-sync detector responsive to the output signal of said clock counter for detecting an end of horizontal synchronization and producing therefrom output pulse;

a start-of-vertical-sync detector responsive to the output signal of said line counter for detecting a start of vertical synchronization and producing therefrom an output pulse;

an end-of-vertical-sync detector responsive to the output signal of said line counter for detecting an end of vertical synchronization and producing therefrom an output pulse; and a logic circuit responsive to the output pulses of the start-of-horizontal-sync detector, the end-of-horizontal-sync detector, the start-of-vertical-sync detector and the end-of-vertical sync detector for producing a first sequence of pulses defining said horizontal blanking interval and said vertical blanking interval, and a second sequence of pulses having edges corresponding to the pulses of the pattern produced by the horizontal sync decoder during the defined horizontal blanking interval and corresponding to the pulses of the pattern produced by the vertical sync decoder during the defined vertical blanking interval, said first sequence of pulses enabling and disabling said memory depending on the logic levels thereof, and said first and second sequences of pulses being supplied to said multiplexer means for alternately multiplexing the pedestal level data and the sync level data when the memory is disabled.

14. A video processor as claimed in claim 3, wherein said field memory has a memory size smaller than would be required to store all information contained in each field of the incoming composite video signal.

15. A video processor as claimed in claim 7, wherein said field memory has a memory size smaller than would be required to store all information contained in each field of the incoming composite video signal.

16. A video processor as claimed in claim 7, further comprising:

an address counter for generating a read/write address for said memory in response to said system clock pulse; and a reset counter for counting said system clock pulse and resetting said address counter to an initial value when the system clock pulse is counted a predetermined number of times.

17. A video processor as claimed in claim 12, further comprising:

an address counter for generating a read/write address for said memory in response to said system clock pulse; and a reset counter for counting said system clock pulse and resetting said address counter to an initial value when the system clock pulse is counted a predetermined number of times.

18. A video processor as claimed in claim 12, further comprising means for providing phase alignment between picture information read out of said memory and bit-parallel signals from said serial-to-parallel converter.

19. A video processor as recited in claim 1, wherein said means for detecting comprises:

a sync separator for separating the composite video signal into a horizontal pulse indicating a start timing for a horizontal scan line, and a vertical pulse indicating a vertical scan interval;

a clock counter for counting clock pulses and producing a signal indicating an instantaneous timing position of said clock pulses with respect to the start timing for a horizontal scan line;

a half-line counter, reset by said clock counter, for outputting two pulses for each of said horizontal scan lines;

a line counter for counting the output of said half-line counter, said half-line counter being reset by said vertical pulse; and logic means for receiving output signals from said clock counter and said line counter and for outputting an enable signal for said field memory.

* * * * *